US011578145B2

(12) United States Patent
Curren et al.

(10) Patent No.: US 11,578,145 B2
(45) Date of Patent: Feb. 14, 2023

(54) SYSTEM AND METHOD FOR RAPID DUMP TANK HEATING

(71) Applicant: Chevron Phillips Chemical Company LP, The Woodlands, TX (US)

(72) Inventors: Joseph A. Curren, Houston, TX (US); James E. Hein, Houston, TX (US); Ralph W. Romig, Kingwood, TX (US); Ai-Fu Chang, Tomball, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 68 days.

(21) Appl. No.: 17/314,236

(22) Filed: May 7, 2021

(65) Prior Publication Data

US 2021/0261694 A1    Aug. 26, 2021

Related U.S. Application Data

(63) Continuation of application No. 16/404,409, filed on May 6, 2019, now Pat. No. 11,021,549.

(51) Int. Cl.
| | | |
|---|---|---|
| *C08F 2/01* | (2006.01) | |
| *B01J 4/00* | (2006.01) | |
| *B01J 19/00* | (2006.01) | |
| *B01J 19/18* | (2006.01) | |
| *C08F 6/00* | (2006.01) | |
| *C08F 2/00* | (2006.01) | |
| *C08F 10/00* | (2006.01) | |

(52) U.S. Cl.
CPC ............... *C08F 2/008* (2013.01); *B01J 4/001* (2013.01); *B01J 4/008* (2013.01); *B01J 19/0053* (2013.01); *B01J 19/1837* (2013.01); *C08F 2/01* (2013.01); *C08F 6/005* (2013.01); *B01J 2204/002* (2013.01); *B01J 2204/007* (2013.01); *B01J 2219/00092* (2013.01); *B01J 2219/00094* (2013.01); *C08F 10/00* (2013.01)

(58) Field of Classification Search
USPC .................................................. 528/498, 501
See application file for complete search history.

(56) References Cited

U.S. PATENT DOCUMENTS

| | | |
|---|---|---|
| 4,424,341 A | 1/1984 | Hanson |
| 6,566,460 B1 | 5/2003 | Salmon |
| 7,342,079 B2 | 3/2008 | Sher |
| | (Continued) | |

FOREIGN PATENT DOCUMENTS

| | | |
|---|---|---|
| CA | 2498745 C | 8/2009 |
| CN | 207699496 U | 8/2018 |
| WO | 2020227251 A1 | 11/2020 |

*Primary Examiner* — Fred M Teskin
(74) *Attorney, Agent, or Firm* — Conley Rose, P.C.

(57) ABSTRACT

A method of operating a dump tank of a polymer production process by transferring all or a portion of a content of a polymerization reactor into the dump tank, wherein the reactor contents comprise solid polymer, and liquid and gaseous non-product components, and removing at least a portion of the liquid and gaseous non-product components from the dump tank by: reducing a pressure of the dump tank, subjecting the solid polymer to a first cleaning stage comprising heating the solid polymer by introducing a first heated treatment gas into the dump tank, and subjecting the solid polymer to a second cleaning stage comprising purging the solid polymer by introducing a second heated treatment gas into the dump tank.

21 Claims, 5 Drawing Sheets

(56) References Cited

U.S. PATENT DOCUMENTS

| | | | |
|---|---|---|---|
| 7,524,904 B2 * | 4/2009 | Verser | C08F 6/003 |
| | | | 526/918 |
| 7,999,044 B2 | 8/2011 | Hottovy | |
| 9,861,955 B2 | 1/2018 | Romig | |
| 2015/0080533 A1 | 3/2015 | Nguyen | |
| 2016/0264693 A1 | 9/2016 | Hottovy | |
| 2018/0162962 A1 | 6/2018 | Haynie | |

* cited by examiner

SYSTEM AND METHOD FOR RAPID DUMP TANK HEATING

CROSS-REFERENCE TO RELATED APPLICATIONS

This application is a continuation of and claims priority to U.S. patent application Ser. No. 16/404,409 filed May 6, 2019, published as U.S. Patent Application Publication No. 2020/0354483 A1, and entitled "System and Method for Rapid Dump Tank Heating," which is incorporated herein by reference in its entirety.

STATEMENT REGARDING FEDERALLY SPONSORED RESEARCH OR DEVELOPMENT

Not applicable.

TECHNICAL FIELD

The disclosed apparatus, systems, and methods relate to transferring (e.g., "dumping") the contents or inventory of one or more polymerization reactors to a relief vessel (e.g., a "dump" tank). More specifically, the disclosed apparatus, systems, and methods relate to improved dump tanks and methods of removing non-product components from a polymerization reactor inventory comprising polymer fluff transferred to a dump tank during a polymerization reactor dump. Still more specifically, the disclosed apparatus, systems, and methods relate to improved methods of removing non-product components of a polymerization reactor inventory transferred to a dump tank during a polymerization reactor dump via cleaning of the polymer fluff by contact of the polymerization reactor inventory transferred to the dump tank with a first heated treatment gas comprising primarily hydrocarbons, followed by purging of the dump tank with a second heated treatment gas comprising primarily nitrogen.

BACKGROUND

During certain atypical operating situations within a polymerization unit, such as, without limitation, loss of utilities (e.g., power), loss of steam, loss of a circulation pump/circulation pump seal, loss of reactor outlets, or any other significant event where continuing to circulate or have polymer in a polymerization reactor is undesirable, there is a need to quickly divert, drain or empty the polymerization reactor (e.g., to "dump" the contents or "inventory" of the polymerization reactor). Polymerization units are typically equipped with dump tanks for this purpose.

In large units, the length of time necessary to remove residual hydrocarbons from the polymer fluff transferred to the dump tank (also referred to as a polymer bed) can be very long, sometimes longer than 7 days. Removing the residual hydrocarbons from the fluff can sometimes become the critical-path during shutdown activities, and there is a desire to speed up the removal process. The hydrocarbon removal process can take a long time because residual liquids must be evaporated, and residual hydrocarbons sorbed into the polymer bed must be cleared. Both of these processes are strongly dependent upon temperature and heat input, and conventional plants have limited ability to introduce a significant amount of heat into the stagnant, non-flowing bed of polymer and liquids in the dump tank. Conventionally, the dump tank is equipped with a steam jacket on a bottom cone thereof. However, the polymer is a fairly good insulator and there is also considerable risk of melting stagnant, trapped lower density polymers against the cone, making it challenging to empty the polymer out of the dump tank after clearing the hydrocarbons therefrom by heating with such a steam jacket.

Accordingly, there exists a need for systems and methods for enhancing a polymerization reactor dumping process.

SUMMARY

Herein disclosed is a method of operating a dump tank of a polymer production process, the method comprising: transferring all or a portion of a content of a polymerization reactor into the dump tank, wherein the reactor contents comprise solid polymer, and liquid and gaseous non-product components; and removing at least a portion of the liquid and gaseous non-product components from the dump tank by: reducing a pressure of the dump tank, whereby a flash gas comprising a first portion of the at least a portion of the liquid and gaseous non-product components is recovered from the dump tank; subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising a second portion of the at least a portion of the liquid and gaseous non-product components from the dump tank during the first cleaning stage; and subjecting the solid polymer to a second cleaning stage comprising purging the solid polymer by introducing a second heated treatment gas comprising primarily nitrogen into the dump tank and recovering a second gas comprising a third portion of the at least a portion of the liquid and gaseous non-product components from the dump tank during the second cleaning stage.

Also disclosed herein is a system comprising: a dump tank into which all or a portion of a content of a polymerization reactor can be transferred during a polymerization reactor dump in a polymer production process, wherein the dump tank comprises: a gas distribution system configured to distribute a treatment gas introduced thereto via a treatment gas inlet line substantially uniformly across a cross section of the dump tank, wherein the gas distribution system is located in a bottom portion of the dump tank; a heater operable to increase temperature of the treatment gas to a treatment gas temperature; an overhead gas line fluidly connecting the dump tank with a flare; and a vent filter on the overhead gas line, wherein the vent filter is operable to collect entrained polymer particles in a gas passing through the overhead gas line.

Further disclosed herein is a method of producing polyolefins, the method comprising: (i) during normal operation: polymerizing a polymerization feed comprising a monomer, a diluent, and optionally a co-monomer in the presence of a polymerization catalyst to produce a polymerization effluent comprising solid polymer, and liquid and gaseous non-product components; passing the polymerization reactor effluent through one or more flashline heaters configured to indirectly heat the polymerization reactor effluent; separating one or more of the non-product components from the polymerization reactor effluent via a separation apparatus; and recycling at least one of the one or more separated non-product components to the polymerization reactor via a recycle line, and (ii) during a polymerization reactor dump: transferring all or a portion of a content of the polymerization reactor into a dump tank, wherein the reactor contents comprise solid polymer, and liquid and gaseous non-product components; and removing at least a portion of the non-product components from the dump tank by: reducing a pressure of the dump tank, whereby a flash gas comprising a first portion of the at least a portion of the non-product components is recovered from the dump tank; subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising a second portion of the at least a portion of the non-product components from the dump tank during the first cleaning stage; and subjecting the solid polymer to a second cleaning stage comprising purging the solid polymer by introducing a second heated treatment gas comprising primarily nitrogen into the dump tank and recovering a second gas comprising a third portion of the at least a portion of the non-product components from the dump tank during the second cleaning stage.

BRIEF DESCRIPTION OF THE DRAWINGS

The detailed description will reference the drawings briefly described below, wherein like reference numerals represent like parts, unless otherwise indicated.

DETAILED DESCRIPTION

Figure 1:
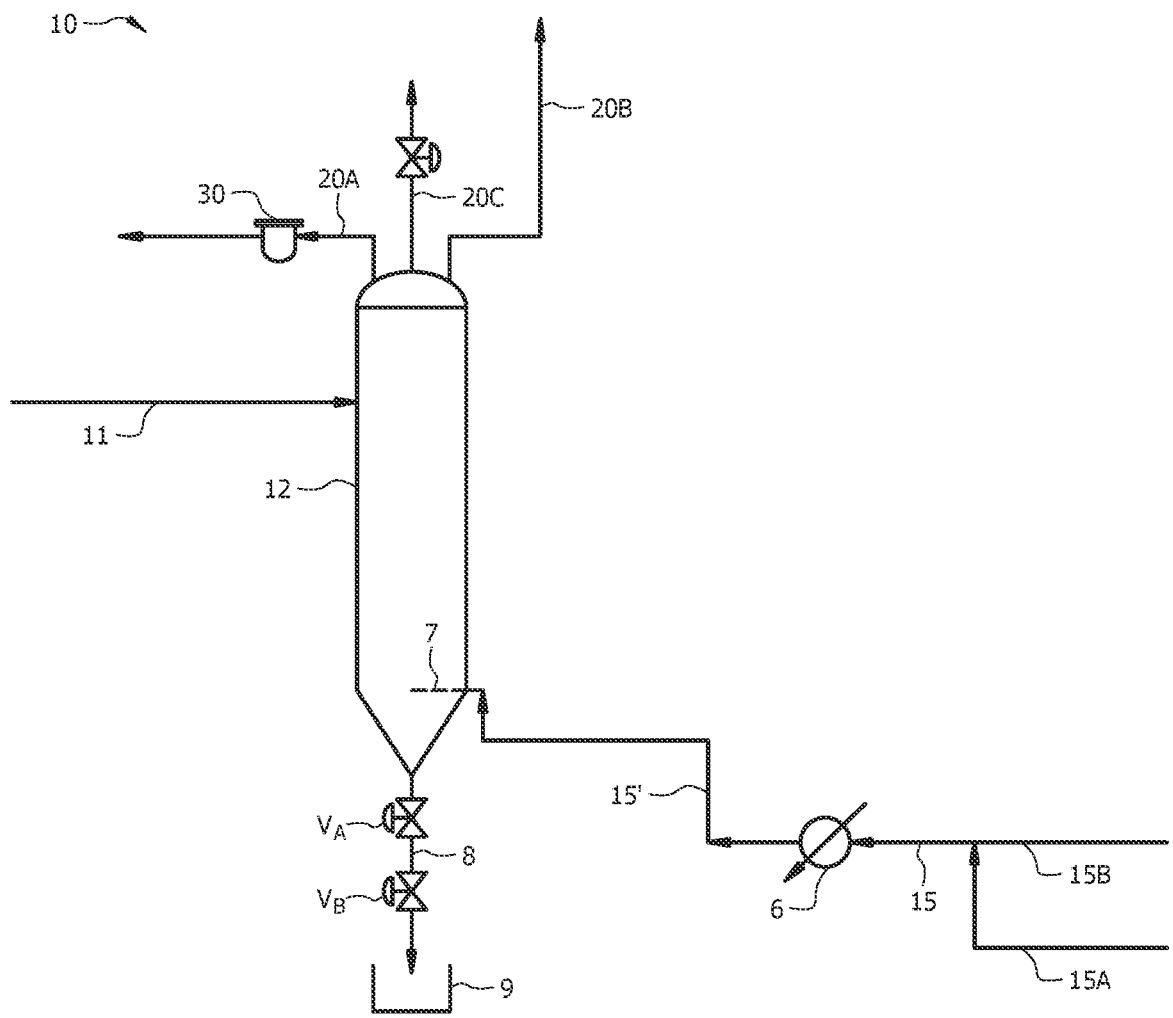
FIG. 1 is a schematic of a dump tank system 10, according to embodiments of this disclosure.

With reference to FIG. 1, which is a simplified schematic of a dump tank system 10, according to embodiments of this disclosure, herein disclosed is a method of operating a dump tank of a polymer production process (e.g., a polyolefin production process such as polyethylene unit), the method comprising: transferring an inventory (also referred to as a quantity of polymer or the reactor contents or the reaction mixture) of polymer (also referred to a polymer fluff, polymer particulates, solid product polyolefin, etc.) from a polymerization reactor into the dump tank, wherein the inventory of polymer fluff comprises solid product polyolefin, and liquid and gaseous non-product components (also referred to herein as 'non-solid' components); and removing at least a portion of the non-product components from the dump tank by: reducing a pressure of the dump tank (e.g., depressurizing), whereby a flash gas comprising a first portion of the at least a portion of the liquid and gaseous non-product components is recovered from the dump tank via an overhead gas line; subjecting the polymer fluff to a first cleaning stage comprising heating the polymer fluff by introducing a first heated treatment gas comprising primarily one or more hydrocarbons into the dump tank until a first cleaning stage temperature of the polymer fluff is attained and recovering a first gas (also referred to as a first vent gas) comprising a second portion of the at least a portion of the liquid and gaseous non-product components from the dump tank during the first cleaning stage; and subjecting the polymer fluff to a second cleaning stage comprising purging the polymer fluff by introducing a second heated treatment gas comprising primarily nitrogen into the dump tank and recovering a second gas (also referred to as a second vent gas) comprising a third portion of the at least a portion of the liquid and gaseous non-product components from the dump tank during the second cleaning stage. A combination of the first portion, the second portion, and the third portion (e.g., the at least a portion of the non-product components) can comprise substantially all (e.g., greater than or equal to about 80, 85, 90, 95, 99, or 100%) of the liquid and gaseous non-product components of the polymerization reactor inventory, in embodiments. The first and second cleaning stages can also be referred to as first and second purging stages, respectively, and the first and second treatment gases can also be referred to as first and second purge gases, respectively.

Figure 2:
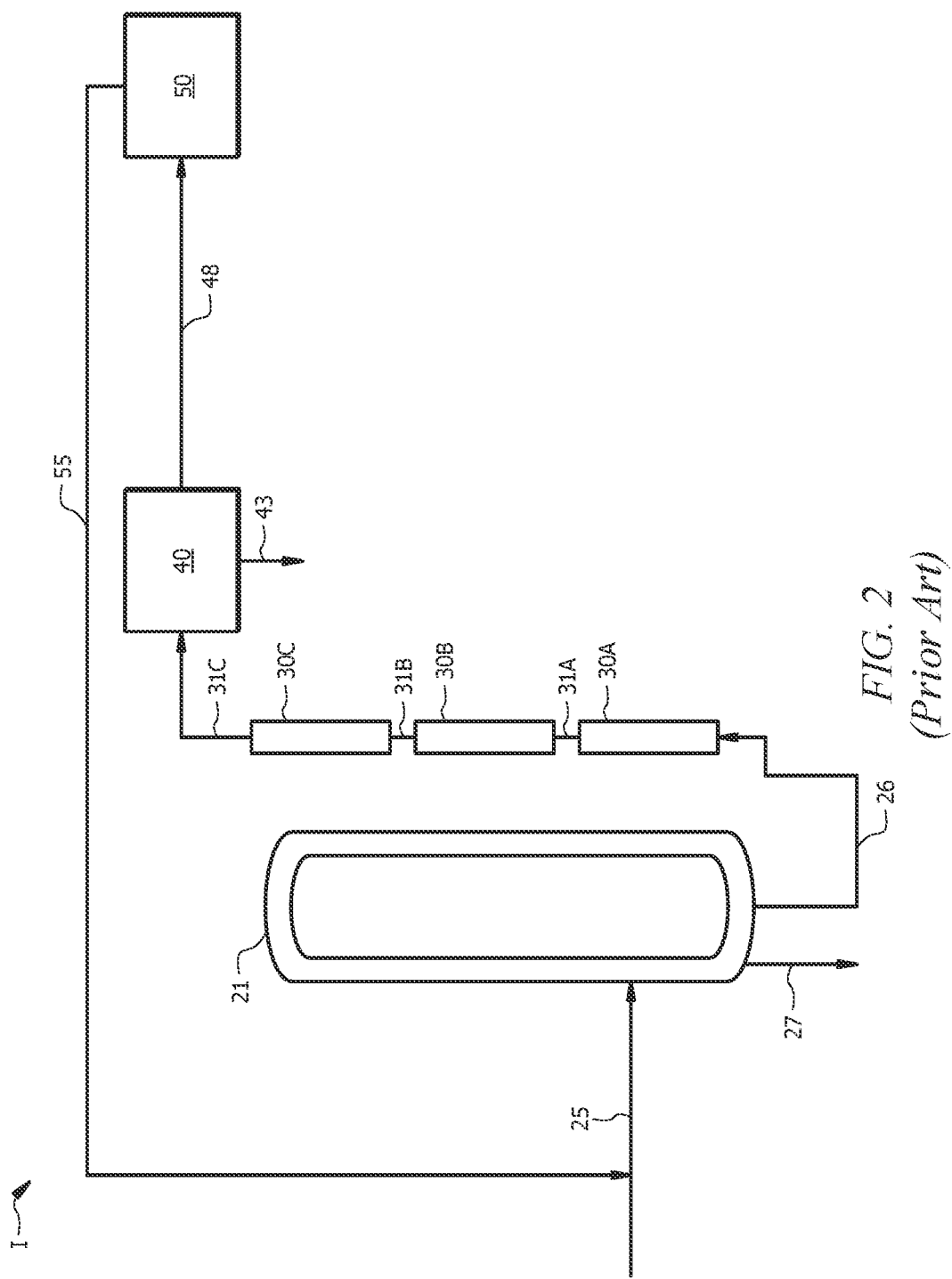
FIG. 2 is a schematic of a prior art polymerization system I within which the inventive dump tank of FIG. 1 may be employed, according to embodiments of this disclosure.

With reference to the embodiment of FIG. 1, during a polymerization reactor dump, polymerization reactor inventory is deinventoried from the polymerization reactor and introduced into dump tank system 10 via dump tank feed line 11. With reference to FIG. 2, which is a schematic of a polymerization system I within which a dump tank of this disclosure (e.g., dump tank system 10 of FIG. 1) can be utilized, according to embodiments of this disclosure, dump tank feed line 11 (of FIG. 1) can be fluidly connected with the polymerization reactor 21, for example via dump tank feed line 11 coupled with a reactor effluent line 26 utilized to transfer polymerization reactor effluent to a downstream separation system 40 during polymerization and/or via dump tank feed line 11 coupled with one or more dedicated dump lines 27 utilized to transfer polymerization reactor inventory to the dump tank during a polymerization reactor dump. For example, without limitation, during a polymerization reactor dump, polymerization reactor inventory can be introduced into dump tank system 10 via dump tank feed line 11 coupled to the reactor effluent line 26, upstream or downstream of a first in-line flash heater (also referred to herein as a "flashline heater"), second in-line flash heater (e.g., second flashline heater), or third in-line flash heater 30C (e.g., third flashline heater), for example, along section 31A, 31B, or 31C, respectively, of polymerization reactor effluent line 26. Alternatively, polymerization reactor inventory can be introduced into dump tank system 10 via dump tank feed line 11 coupled to a solids discharge conduit 41, as described hereinbelow with reference to FIG. 3, and/or via dump tank feed line 11 coupled to the one or more dedicated dump lines 27. In embodiments, a plurality of dump tank feed lines 11 coupled to the polymerization reactor 21, as described above, are utilized to transfer polymerization reactor 21 inventory to dump tank system 10 during a polymerization reactor dump process. Following first and second stage cleaning, as described herein, dump tank inventory can be removed from dump tank vessel 12 via a dump line 8, one or more valves VA/VB, and a vessel (e.g., dumpster) 9.

Referring to FIG. 1, one or more overhead gas lines can be utilized to remove the flash gas, the first gas (e.g., the first vent gas), and the second gas (e.g., the second vent gas) from the dump tank vessel 12, during the depressurizing, the first cleaning stage, and the second cleaning stage, respectively. A first overhead gas line 20A can fluidly connect dump tank vessel 12 with a flare, whereby a gas leaving dump tank vessel 12 via first overhead gas line 20A can be sent to flare.

A vent filter 30 can be positioned on first overhead gas line 20A (and/or second overhead gas line 20B and/or third overhead gas line 20C), such that entrained solids can be removed from a gas passing therethrough prior to flaring. A second overhead gas line 20B and/or a third overhead gas line 20C can fluidly connect dump tank vessel 12 with separation apparatus 40, described further hereinbelow with reference to FIGS. 2 and 3. For example, second overhead gas line 20B can fluidly connect dump tank vessel 12 with a flash chamber 32 of separation apparatus 40, as further described hereinbelow with reference to FIG. 3. Alternatively or additionally, a third overhead gas line 20C can fluidly connect dump tank vessel 12 with a nitrogen separator (e.g., an INRU) as also described further hereinbelow with reference to FIG. 3.

The polymerization reactor inventory can be fed to the dump tank system 10 at pressure. In embodiments, following transfer of the polymerization reactor inventory to dump tank system 10, the dump tank system 10 is isolated from the polymerization reactor (e.g., via one or more valves in dump tank feed line 11) and a pressure of the dump tank vessel 12 is reduced, whereby a flash gas comprising the first portion of the at least a portion of the non-product components is generated and recovered from the dump tank vessel 12 via an overhead gas line 20A, 20B, or 20C. In embodiments, while polymerization reactor 21 is being dumped, flashing through separation apparatus recovers flashed gas, prior to introducing the first heated treatment gas or the second heated treatment gas into dump tank vessel 12.

As noted hereinabove, removing at least a portion of the non-product components from the dump tank can comprise reducing a pressure of (i.e., depressurizing) the dump tank, whereby the flash gas comprising a first portion of the at least a portion of the liquid and gaseous non-product components is generated and recovered from the dump tank via an overhead gas line. In embodiments, flashing is effected by opening a valve $V_C$ between the dump tank system 10 and a flash chamber 32 (described hereinbelow with reference to FIG. 3) of separation apparatus 40, and the flashed gas is passed via an overhead gas line (e.g., an overhead gas line 20B), which introduces the flash gas comprising the first portion of the at least a portion of the non-product components into the flash chamber 32 of the separation apparatus 40, described further hereinbelow. In such embodiments, the separation apparatus can be utilized to separate one or more non-product components, such as a diluent (e.g., isobutane ($iC_4$)), the hydrocarbon treatment gas (e.g., $iC_4$, fuel gas), monomer (e.g., ethylene), comonomer (e.g., hexane), or a combination thereof from the flash gas. In embodiments, flashing comprises venting the dump tank vessel 12 to a nitrogen separator 45 (e.g., an INRU) of the separation apparatus 40 (described further hereinbelow with reference to FIG. 3), via an overhead gas line (e.g., a third overhead gas line 20C), which introduces the flash gas comprising the first portion of the at least a portion of the non-product components into the nitrogen separator 45 of the separation apparatus 40, described further hereinbelow.

According to this disclosure, removing at least a portion of the non-product components from the dump tank comprises subjecting the polymer fluff of the transferred polymerization reactor inventory in the dump tank system 10 to a first cleaning stage (also referred to herein as a first purging stage) comprising heating the polymer fluff by introducing a first heated treatment gas comprising primarily one or more hydrocarbons (also referred to herein as a heated hydrocarbon treatment gas) into the dump tank vessel 12 until a first cleaning stage temperature of the polymer fluff is attained and recovering a first gas (e.g., a first vent gas) comprising a second portion of the at least a portion of the liquid and gaseous non-product components from the dump tank vessel 12 during the first cleaning stage.

According to this disclosure, the heated hydrocarbon treatment gas introduced into the dump tank vessel 12 during the first cleaning stage comprises, consists essentially of, or consists of one or more hydrocarbons having from one to five carbons (C1-C5 hydrocarbons). In embodiments, the heated hydrocarbon treatment gas comprises, consists essentially of, or consists of isobutane, isopentane, fuel gas, propane, propylene, or a combination thereof. As utilized herein, "fuel gas" comprises natural gas, e.g., supplied via pipeline to the plant. For example, the fuel gas can comprise or consist of 90 wt % methane or more, with the balance comprising primarily ethane, carbon dioxide, nitrogen, and/or other small quantities of lighter hydrocarbon gases that can accompany natural gas pipelines. In an embodiment, the heated hydrocarbon treatment gas comprises, consists essentially of, or consists of isobutene. In embodiments, the heated hydrocarbon treatment stream contains less than 50, 45, 40, 35, 30, 25, 20, 15, 10, 9, 8, 7, 6, 5, 4, 3, 2, 1, 0.5, or 0.1 weight percent of gas components other than C1-C5 hydrocarbons.

According to this disclosure, removing at least a portion of the non-product components from the dump tank further comprises, after the first cleaning stage, subjecting the polymer fluff in dump tank system 10 to a second cleaning stage (also referred to herein as a second purging stage) comprising purging the polymer fluff by introducing a second heated treatment gas (also referred to as a heated nitrogen treatment gas) comprising, consisting essentially of, or consisting of nitrogen into the dump tank vessel 12 and recovering a second gas (e.g., a second vent gas) comprising a third portion of the at least a portion of the liquid and gaseous non-product components from the dump tank vessel 12 during the second cleaning stage. In embodiments, the second heated treatment gas contains less than 50, 45, 40, 35, 30, 25, 20, 15, 10, 9, 8, 7, 6, 5, 4, 3, 2, 1, 0.5, or 0.1 weight percent of gas components other than nitrogen. Thus, following the heating provided by the first cleaning stage, purging with nitrogen can be effected during a second cleaning stage, in embodiments, for a period of time to remove residual hydrocarbons from the polymer and the surrounding vapor space in dump tank vessel 12. The first and/or the second cleaning stage can be continued, in embodiments, until a lower explosive limit (LEL) of less than or equal to 10, 5, 4, 3, 2, 1, or substantially 0 vol % of is attained. As utilized herein, the LEL is defined as the concentration of combustible hydrocarbon gases in the vapor space through various mechanisms depending on a meter utilized for the measurement (e.g., infrared absorption, burning via catalytic beads, etc.) of the % LEL.

The heated treatment gas (e.g., heated hydrocarbon treatment gas of the first cleaning stage and the heated nitrogen treatment gas of the second cleaning stage) is introduced into the dump tank vessel 12 at a temperature below a melting temperature of the polymer fluff. The hydrocarbon treatment gas can be introduced via hydrocarbon treatment gas line 15B and treatment gas line 15 into a gas heater 6 (e.g., a steam heater) for heating to provide the heated hydrocarbon treatment gas. Nitrogen can be introduced via nitrogen gas line 15A and treatment gas line 15 into the heater 6 or another heater for heating to provide the second heated treatment gas. Heated treatment gas (e.g., heated hydrocarbon treatment gas during the first cleaning stage, heated nitrogen treatment gas during the second cleaning stage) can be introduced into dump tank vessel 12 via heated treatment gas line 15'. A heater 6 utilized to heat the first treatment gas (e.g., the hydrocarbons, as described above) and provide the first heated treatment gas and/or heat nitrogen and provide the second heated treatment gas can be any suitable heater known to those of skill in the art for heating a treatment gas to a desired temperature to yield heated treatment gas. In embodiments, heater 6 comprises a steam heater. In embodiments, heater 6 comprises a shell and tube heater. In embodiments, a heater 6 utilized to heat the first treatment gas comprises one or more flashline heaters (e.g., 30A, 30B, 30C of FIGS. 2 and 3) of a polymerization system (e.g., polymerization system I of FIG. 2 or integrated polymerization system II of FIG. 3), as described further hereinbelow with reference to the embodiment of FIGS. 2 and 3. In embodiments, a disparate or same heater 6 is utilized to heat the nitrogen for introduction into the dump tank during the second cleaning stage. For example, when one or more flashline heaters are utilized to heat the first treatment gas, a disparate heater may be utilized to heat nitrogen to provide the second treatment gas.

In embodiments, the first heated treatment gas (e.g., the heated hydrocarbon treatment gas) introduced into the dump tank vessel 12 during the first cleaning stage and/or the second heated treatment gas (e.g., the heated nitrogen) introduced into the dump tank vessel 12 during the second cleaning stage has a temperature that is in a range of from about 85 to about 95, from about 80 to about 90, or from about 90 to about 95% of a melting temperature of the polyolefin fluff (e.g., polyethylene homopolymer or polyethylene copolymer such as an ethylene and 1-hexene copolymer). In embodiments, the first heated treatment gas (e.g., the heated hydrocarbon treatment gas) introduced into the dump tank vessel 12 during the first cleaning stage and/or the second heated treatment gas (e.g., the heated nitrogen) introduced into the dump tank vessel 12 during the second cleaning stage has a temperature that is in a range of from about ambient to about 200° F. (from about ambient to about 93.3° C.), from about 68° F. to about 200° F. (from about 20° C. to about 93.3° C.), from about 68° F. to about 190° F. (from about 20° C. to about 87.8° C.), from about 70-90° F. to about 190-200° F. (from about 21.1-32.2° C. to about 87.8-93.3° C.), from about 70-90° F. to about 160-180° F. (from about 21.1-32.2° C. to about 71.1-82.2° C.). To prevent condensation of the hydrocarbon treatment gas within dump tank vessel 12, in embodiments, the hydrocarbon treatment gas can be superheated by heater 6 to a temperature above the dewpoint temperature thereof prior to being introduced into dump tank vessel 12.

In embodiments, a dump tank back pressure is maintained during the first cleaning stage. For example, in embodiments, a dump tank back pressure of greater than or equal to about 5, 70, 100, or 130 psig or in a range of from about 5 to about 130 psig, from about 5 to about 70 psig, from about 5 to about 30 psig, or from about 70 to about 130 psig is maintained during at least a portion of the first cleaning stage. Maintaining a dump tank back pressure can allow utilization of a lower superficial velocity of the heated hydrocarbon treatment gas while employing a higher mass flow rate of the heated hydrocarbon treatment gas (e.g., isobutane).

The introduction of the treatment gas (e.g., the heated hydrocarbon treatment gas during the first cleaning stage and the heated nitrogen treatment gas during the second cleaning stage) can be at such a velocity that it is either greater than or less than the minimum fluidization velocity for the bed of polymer in the dump tank vessel 12. In embodiments, the heated hydrocarbon treatment gas introduced into the dump tank vessel 12 during the first cleaning stage and/or the heated nitrogen treatment gas introduced into the dump tank vessel 12 during the second cleaning stage is introduced at a superficial velocity that is below a minimum fluidization velocity of the polymer fluff in the dump tank vessel 12. Maintaining the superficial velocity below the minimum fluidization velocity can advantageously reduce the amount of entrained fine particles overhead (e.g., exiting the dump tank vessel 12 via streams 20A, 20B, or 20C) during the first cleaning stage and/or the second cleaning stage.

As will be understood by one of skill in the art and with the help of this disclosure, in embodiments wherein the velocity is limited to a particular maximum velocity due to fluidization considerations, there can be a tradeoff between backpressure held in the dump tank vessel 12, the resulting density of the hydrocarbon treatment gas (e.g., isobutane) vapor, the saturation temperature/dewpoint of the hydrocarbon treatment gas (e.g., isobutane) vapor, the maximum temperature that may be used without melting the polymer fluff (e.g., 190° F.) and the maximum rate of heating by the vapor of the hydrocarbon treatment gas.

In embodiments, the flow of heated treatment gas (e.g., the heated hydrocarbon treatment gas during the first cleaning stage and the heated nitrogen treatment gas during the second cleaning stage) is increased such that a superficial velocity greater than or equal to the minimum fluidization velocity is utilized, and the polyolefin fluff is fluidized. In such embodiments, appropriate considerations can be taken for fluidization, such as incorporation of a grid plate, fines separation, etc., as will be understood by those of skill in the art and with the help of this disclosure.

In embodiments, the first cleaning stage temperature, defined as an interior temperature to which the polymer fluff is brought during the first cleaning stage, is in a range of from about 85 to about 95, from about 80 to about 90, or from about 90 to about 95% of a melting temperature of the polymer fluff. In embodiments, the first cleaning stage temperature is a temperature in a range of from about 120 to about 190° F. (from about 49 to about 87° C.), from about 120 to about 130° F. (from about 49 to about 54° C.), from about 150 to about 190° F. (from about 65 to about 87° C.), from about 160 to about 190° F. (from about 71 to about 87° C.), from about 150 to about 180° F. (from about 65 to about 82° C.), or greater than or equal to about 150, 160, 170, 180 or 190° F. (about 65, 71, 76, 82 or 87° C.). In embodiments, first stage cleaning is effected until the bed temperature measurements are each within 10 or 15° F. of the inlet temperature to avoid waiting an excessive amount of time for the last bit of heating to occur.

In embodiments, during the first cleaning stage, a rate of heating per cross sectional area of the dump tank vessel 12 of greater than or equal to about 5000, 6000, or 7000 BTU/h-ft$^2$ is provided by the introduction of the first heated treatment gas (e.g., the heated hydrocarbon treatment gas). In embodiments, a method of operating a dump tank system 10 according to this disclosure further comprises selecting a flow rate of the heated hydrocarbon treatment gas, a temperature of the heated hydrocarbon treatment gas introduced into the dump tank vessel 12 during the first cleaning stage, a back pressure of the dump tank vessel 12 during the first cleaning stage, or a combination thereof to minimize a first cleaning stage time, wherein the first cleaning stage time is a duration of the first cleaning stage. In embodiments, the first cleaning stage temperature of the first cleaning stage is attained in a first cleaning stage time of less than or equal to about 24, 23, 22, 21, 20, 19, 18, 17, 16, 15, 14, 13, 12, 11, 10, 9, 8, 7, 6, 5, 4, 3, 2 or 1 hours. In embodiments, by selecting the conditions of the first cleaning stage as described herein, heating of the bed of polymer fluff in the dump tank vessel 12 to the first cleaning stage temperature can be accomplished within a first cleaning stage time of from about 4 to about 8 hours, from about 12 to about 18 hours, or from about 4 to about 20 hours.

In embodiments, a method of operating a dump tank, including a depressurizing step and first and second cleaning stages, can be effected in a total cleaning time of less than or equal to about 24, 23, 22, 21, 20, 19, 18, 17, 16, 15, 14, 13, 12, 11, 10, 9, 8, 7, 6, 5, 4, 3, 2 or 1 hours.

In embodiments, a time required to remove the at least a portion of the liquid and gaseous non-product components from the polymer fluff (e.g., via recovery of the flash gas, the first gas, and the second gas from the dump tank vessel 12) is less than or equal to about 10, 20, 30, 40, 50, 60, 70, or 80% of a time required to remove a same at least a portion of the non-product components from a same polymer fluff via a same method except utilizing solely a heated treatment gas comprising primarily nitrogen without a first cleaning stage wherein the first treatment gas comprising primarily one or more hydrocarbons (e.g., isobutane) is introduced into dump tank vessel 12 (i.e., absent the first cleaning stage and having only the second cleaning stage with nitrogen).

In embodiments, the first heated treatment gas (e.g., the heated hydrocarbon treatment gas) introduced into the dump tank vessel 12 during the first cleaning stage and/or the second heated treatment gas (e.g., the heated nitrogen treatment gas) introduced into the dump tank vessel 12 during the second cleaning stage is introduced into a bottom portion (e.g., a bottom 10, 20, 30, 40% of a total height $H_T$) of the dump tank vessel 12, as described hereinbelow with regard to FIG. 4, which is a schematic of a dump tank vessel 12, according to embodiments of this disclosure.

In embodiments, the heated treatment gas (e.g., the heated hydrocarbon treatment gas of the first cleaning stage and/or the heated nitrogen treatment gas of the second cleaning stage) is introduced into the dump tank vessel 12 via a gas distribution system 7 operable to distribute the heated treatment gas substantially uniformly about a cross sectional area of the dump tank vessel 12, while allowing downward flow of polymer therein subsequent introduction of the treatment gas thereto. The gas distribution system 7 may be or resemble the gas distribution system in a purge column (e.g., such as purge column 42 described further hereinbelow), or alternatively it may be or resemble a fluidized bed grid plate, or it may be any suitable mechanism for distributing gas in a bed of polymer while still allowing for downward flow of the polymer following cleaning/degassing. In embodiments, the gas distribution system comprises a fluidized bed grid plate, a J-Purge™, a gas distributor (e.g., circular gas distribution manifold), or a combination thereof.

In embodiments, the first gas recovered from the dump tank system 10 during the first cleaning stage is removed from dump tank vessel 12 via an overhead gas line (e.g., the first overhead gas line 20A), and sent to flare, following filtering thereof (e.g., in vent filter 30). Alternatively, the first gas recovered from the dump tank system 10 during the first cleaning stage is removed from dump tank vessel 12 via an overhead gas line (e.g., the second overhead gas line 20B or third overhead gas line 20C) fluidly connected with separation apparatus 40, and one or more components (e.g., hydrocarbons, diluent, hydrocarbon treatment gas) can be separated therefrom prior to recycle (e.g., recycle of hydrocarbons and/or diluent to polymerization reactor 21; recycle of hydrocarbon treatment gas to dump tank system 10; and/or recycle of diluent to dump tank system 10 when the diluent is the hydrocarbon treatment gas such as isobutane) or flaring thereof. In embodiments, the second gas recovered from the dump tank system 10 during the second cleaning stage is removed from dump tank vessel 12 via an overhead gas line (e.g., the first overhead gas line 20A), and sent to flare, following filtering thereof (e.g., in vent filter 30). Alternatively, the second gas recovered from the dump tank system 10 during the second cleaning stage is removed from dump tank vessel 12 via an overhead gas line fluidly connected with separation apparatus 40 (e.g., the second overhead gas line 20B or the third overhead gas line 20C), and one or more components (e.g., hydrocarbons, nitrogen) separated therefrom prior to recycle (e.g., recycle of hydrocarbons to reactor 21, recycle of nitrogen to dump tank vessel 12) or flare thereof. For example, in embodiments, the polyolefin production process comprises a nitrogen separator 45 (e.g., an isobutane and nitrogen recovery unit (INRU)), as described further hereinbelow with reference to FIG. 3, and at least a portion of the nitrogen introduced into the dump tank system 10 as the second treatment gas during the second cleaning stage comprises nitrogen recovered and recycled from the nitrogen separator 45. In embodiments, the second gas comprising nitrogen and purged residual hydrocarbons is introduced via third overhead gas line 20C into the nitrogen separator 45, and nitrogen in nitrogen line 46 separated therefrom in the nitrogen separator 45 is returned to dump tank system 10 (e.g., via line 15A coupled to nitrogen line 46) for use as second treatment gas (e.g., nitrogen treatment gas) during the second cleaning stage. In such embodiments, the hydrocarbons in hydrocarbon stream 48B separated from the second gas in the nitrogen separator 45 can be subsequently returned to polymerization reactor 21, upon its placement back online. In such embodiments, fresh nitrogen (e.g., via line 15A coupled to fresh nitrogen line 47) can be utilized as a second portion of the second treatment gas after nitrogen recycled from the nitrogen separator 45 is utilized as a first portion of the second treatment gas.

As will be appreciated by those of skill in the art and with the help of this disclosure, nitrogen purging in the second cleaning stage and venting to flare requires the addition of fuel gas (e.g., the addition of fuel gas after the heated nitrogen treatment gas is recovered from purge vessel 12) to meet a minimum heating value for combustion efficiency and also produces NOx emissions. In embodiments according to this disclosure, utilizing the first heated treatment gas comprising primarily hydrocarbons during a first cleaning stage rather than solely nitrogen purging to purge the dump tank vessel 12 can reduce an amount of NOx emissions produced during purging of the dump tank vessel 12. In embodiments, the first gas and/or the second gas is flared, and the herein disclosed method produces an amount of NOx emissions from flaring that is less than or equal to an amount of NOx emissions produced via a same method except utilizing solely a heated treatment gas comprising primarily nitrogen without the first treatment gas comprising primarily one or more hydrocarbons (i.e., purging the dump tank using only nitrogen without the first cleaning stage using hydrocarbons such as isobutane).

Figure 4:
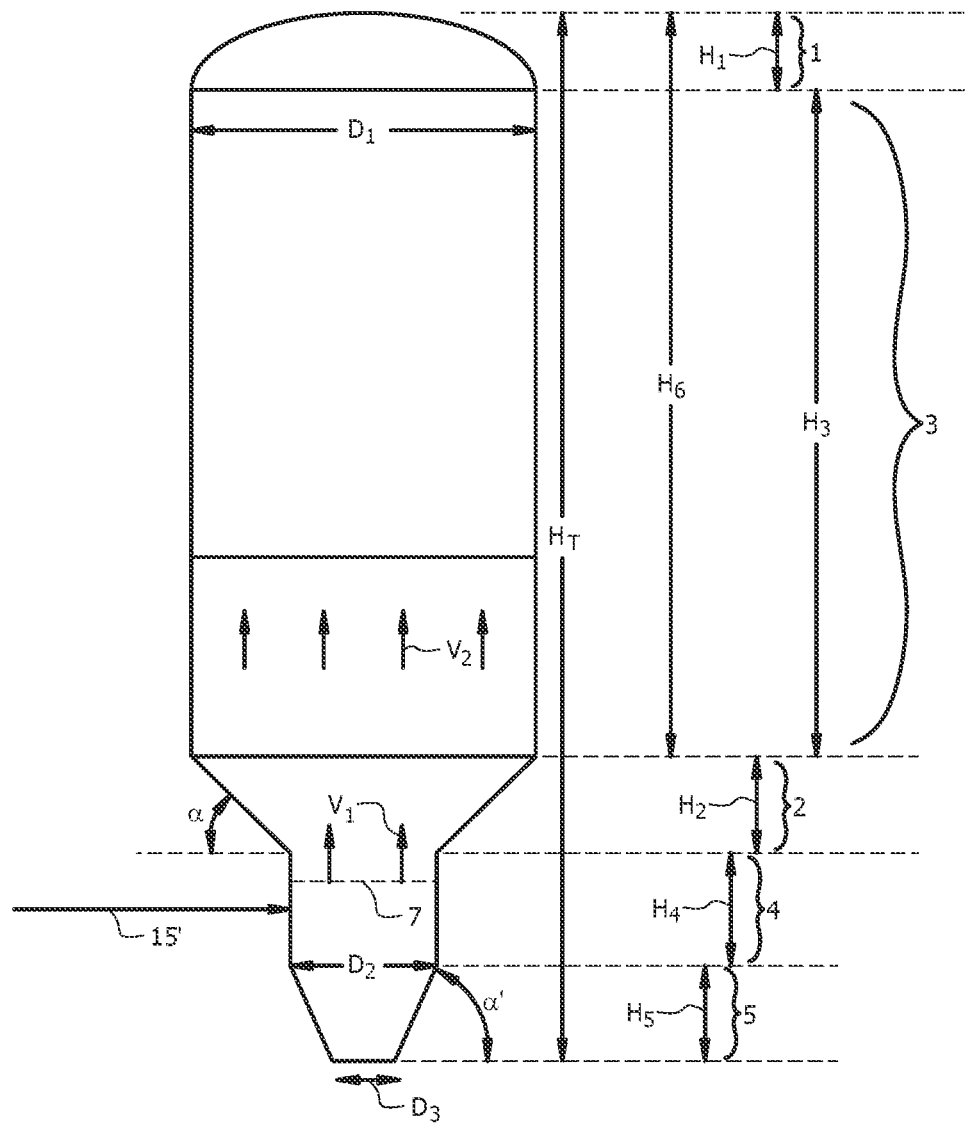
FIG. 4 is a schematic of a dump tank vessel 12, according to embodiments of this disclosure.

With reference to FIG. 4, in embodiments, dump tank vessel 12 is a generally cylindrical vessel having a cap section 1, a bottom cone section 2, and a straight section 3. Straight section 3 of vessel 12 is above bottom cone section 2 and can have a height $H_3$ in a range of from about 8-10 to about 80-100 feet or more (from about 2.4-3.0 to about 24-30 m or more). Straight section 3 of vessel 12 can have an interior diameter $D_1$ in a range of from about 6 to about 25 feet (from about 1.8 to about 7.6 m). In embodiments, cap 1 of vessel 12 can have a height $H_1$ of about twice the diameter $D_1$. In embodiments, cap 1 of vessel 12 is ellipsoidal, and $H_1$ is about 20, 25, 30, 40, or 50% $D_1$. The bottom cone section 2 can have a height $H_2$ in a range of from about 3 to about 35 feet (from about 0.9 to about 10.6 m). In embodiments, bottom cone section 2 forms an angle α of less than or equal to 45, 60, or 70 degrees from horizontal. Utilization of such an angle α can minimize an amount of polymer fluff below the gas distribution system 7. A section 4 can be located below bottom cone section 2. Section 4 can contain an insert for altering the flow of gas (e.g., treatment gas) introduced thereto, such as, without limitation, a J-Purge™ cross available from Jenike and Johanson, a Chinese hat insert, or a Binsert. Section 4 can have straight sides with a height $H_4$ in a range of from about 2 to about 12 feet (from about 0.6 to about 3.6 m). Section 4 of vessel 12 can have an interior diameter $D_2$ in a range of from about 2 to about 12 feet (from about 0.6 to about 3.6 m). A bottom nozzle 5 can be located below bottom cone section 2 and/or section 4, when present. Bottom nozzle 5 can be conical. In embodiments, bottom nozzle 5 can have a height $H_5$ in a range of from about 1 to about 17 feet (from about 0.3 to about 5.1 m), from about 1 to about 20 feet (from about 0.3 to about 6.0 m), or from about 2 to about 20 feet (from about 0.6 to about 6.0 m). Nozzle 5 can have an outlet diameter $D_3$ in a range of from about 1 to about 5 feet (from about 0.3 to about 1.5 m), from about 1 to about 4 feet (from about 0.3 to about 1.2 m), or from about 1 to about 3 feet (from about 0.3 to about 0.9 m). In embodiments, bottom nozzle 5 forms an angle α' of less than or equal to 45, 60, or 70 degrees from horizontal. In embodiments, height $H_6$ equals the sum of the height $H_1$ of cap land the height $H_3$ of straight section 3. In embodiments a total height $H_T$, equal to $H_1+H_2+H_3+H_4+H_5$ is in a range of from about 10 to about 100 feet or more (from about 3.0 to about 30.4 m or more), from about 30 to about 100 feet (from about 6.0 to about 30.4 m), or from about 20 to about 100 feet (from about 6.0 to about 30.4 m).

The gas distribution system 7 can be at least partially disposed within the bottom cone section 2, proximate above the bottom cone section 2 (e.g., within 5, 4, 3, 2, 1, or 0.5 feet), proximate below the bottom cone section 2 (e.g., within 5, 4, 3, 2, 1, or 0.5 feet), or a combination thereof. For example, in the embodiment of FIG. 4, gas distribution system 7 is below cone section 2, within section 4. In embodiments, gas distribution system 7 is located at the bottom outlet of bottom cone section 2. In embodiments, gas distribution system 7 comprises a distributor located in the bottom portion (e.g., lower 10, 15, 20, 30, or 40% of the total height $H_T$) of the dump tank vessel 12.

In embodiments, dump tank vessel 12 does not comprise a steam jacket in contact therewith to provide heat to the vessel 12. For example dump tank vessel 12 does not comprise a steam jacket conventionally utilized on the bottom cone section 2.

In embodiments, the first heated treatment gas (e.g., the heated hydrocarbon treatment gas) is introduced into dump tank vessel 12 at a flow rate in a range of from about 2,500 to about 20,000 lb/h, from about 2,000 to about 20,000 lb/h, or from about 1,000 to about 20,000 lb/h. In some such embodiments, the first heated treatment gas comprises fuel gas. In embodiments, the first heated treatment gas (e.g., the heated hydrocarbon treatment gas) is introduced into dump tank vessel 12 at a flow rate in a range of from about 20,000 to about 200,000 lb/h, from about 10,000 to about 200,000 lb/h, or from about 20,000 to about 150,000 lb/h. In some such embodiments, the first heated treatment gas comprises isobutane. In embodiments, the first heated treatment gas (e.g., the heated hydrocarbon treatment gas) is distributed via gas distribution system 7 at a velocity (indicated as V1) in a range of from about 2 to about 30 ft/min (from about 0.01 to about 0.15 m/s), and a superficial velocity within straight section 3 (indicated as V2) in a range of from about 1 to about 6 ft/min (from about 0.005 to about 0.03 m/s). In embodiments, the second heated treatment gas (e.g., the heated nitrogen treatment gas) is introduced into dump tank vessel 12 at a flow rate in a range of from about 2,000 to about 20,000 lb/h, from about 5,000 to about 10,000 lb/h, or from about 2,000 to about 10,000 lb/h. In embodiments, the second heated treatment gas (e.g., the nitrogen treatment gas) is distributed via gas distributor 7 at a velocity (indicated as V1) in a range of from about 2 to about 30 ft/min (from about 0.01 to about 0.15 m/s), and a superficial velocity within straight section 3 (indicated as V2) in a range of from about 1 to about 6 ft/min (from about 0.005 to about 0.03 m/s).

Figure 3:
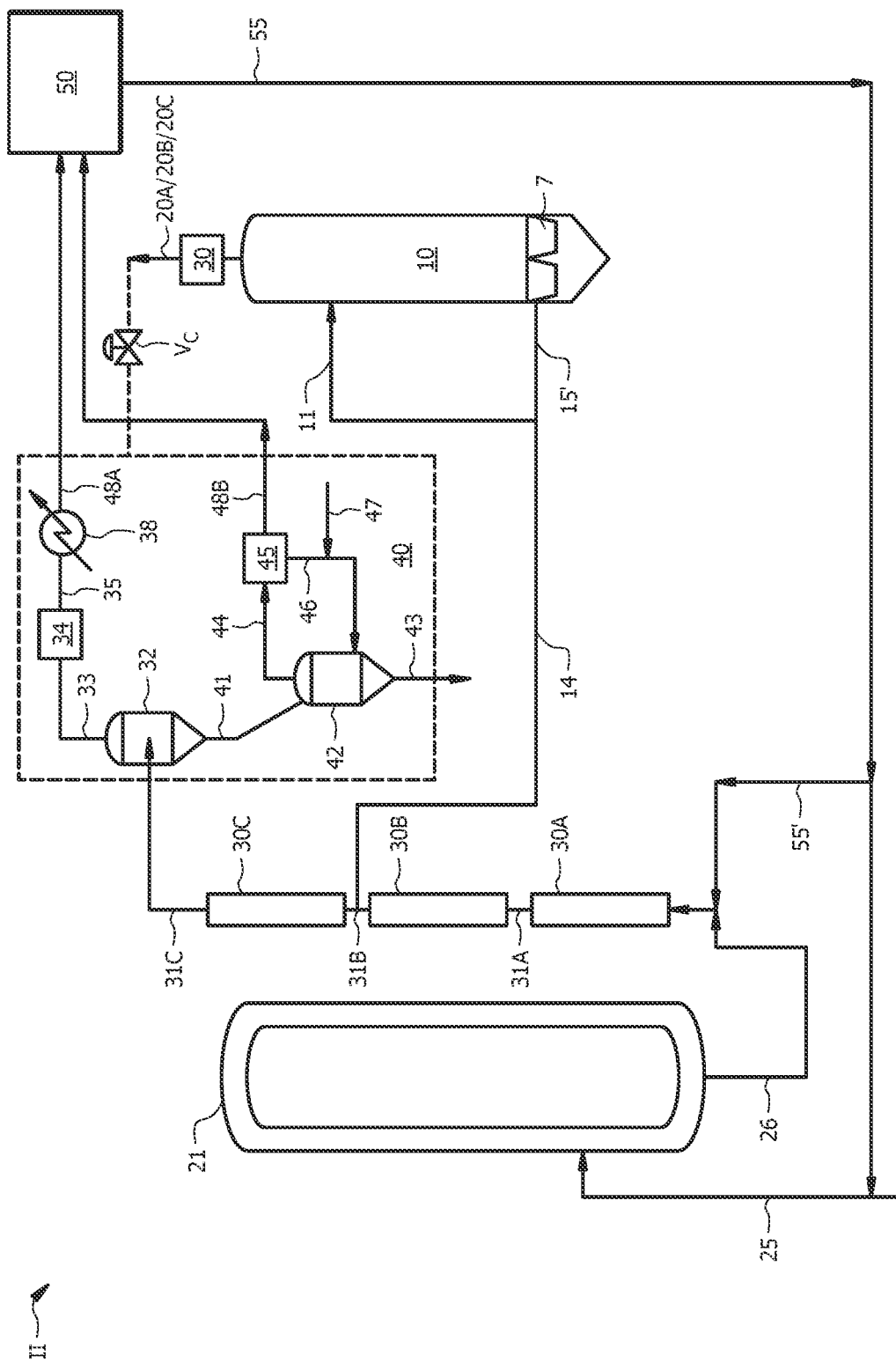
FIG. 3 is a schematic of an integrated polymerization system II comprising a dump tank system 10, according to embodiments of this disclosure.

To facilitate the subsequent description, a polymerization system for which a dump tank system 10 of this disclosure and a method of operating the dump tank system 10 can be utilized will now be described with reference to FIG. 2, which is a schematic of a polymerization system I, according to embodiments of this disclosure, and FIG. 3, which is a schematic of an integrated polymerization system II comprising a dump tank system 10, according to embodiments of this disclosure. The polymerization system can comprise one or more polymerization reactors 21, such as liquid-phase or gas-phase reactors. The polymerization system can also comprise a combination of liquid and gas-phase reactors. If the polymerization system comprises multiple polymerization reactors, the polymerization reactors may be arranged in series, in parallel, or in any other suitable combination or configuration. In the polymerization reactors, one or more olefin monomers are polymerized to form a product comprising polymer particulates, typically and herein called polymer fluff. The polymer fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected, as known to those of skill in the art and with the help of this disclosure, to achieve the desired polymer fluff properties. In addition to the one or more olefin monomers, a catalyst that facilitates polymerization of the monomer is typically added to the polymerization reactor 21. The catalyst may be a particle suspended in the fluid medium within the polymerization reactor 21. In general, Phillips catalyst, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. An olefin-free diluent or mineral oil may be used, for example, in the preparation and/or delivery of the catalyst to the polymerization reactor 21. Further, diluent may be fed into the polymerization reactor 21, typically a liquid-phase reactor. The diluent may be an inert hydrocarbon that is liquid at reaction conditions, such as, without limitation, isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the polymerization reactor 21, for example forming a slurry. Some polymerization processes may not employ a separate diluent, such as in the case of selected polypropylene production where the propylene monomer itself may act as the diluent. As noted hereinabove, the first treatment gas (e.g., the heated hydrocarbon treatment gas) utilized during dump tank cleaning can comprise the diluent (e.g., isobutane, isopentane).

A motive device may be present within the polymerization reactor 21 of the polymerization system. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

As discussed above, the polymerization system I or integrated polymerization system II can comprise one or more polymerization reactors 21, which may in turn be of the same or different types. Furthermore, in multiple reactor systems, the reactors may be arranged serially or in parallel. Whatever the reactor types, a solid polyolefin particulate product, generically referred to as "polymer fluff" herein, is produced. In embodiments, polymerization reactor 21 comprises a reactor within which polymerization occurs within a liquid phase. Examples of such liquid phase reactors include autoclaves, boiling liquid-pool reactors, loop slurry reactors, and so forth. In embodiments, the polymerization reactor 21 comprises a loop slurry reactor. In embodiments, the solid product polyolefin comprises polyethylene (and its copolymers). It is to be understood that the present techniques are similarly applicable to other types of liquid phase reactors and polymerizations.

A loop slurry reactor is generally composed of segments of pipe connected by smooth bends or elbows. In embodiments, the polymerization reactor 21 can be used to carry out polyethylene polymerization under slurry conditions in which insoluble particles of polyolefin, such as polyethylene or polypropylene, are formed in a fluid medium and are suspended as slurry until removed. A motive device, such as a pump, circulates the fluid slurry in the reactor. An example of a pump is an in-line axial flow pump with the pump impeller disposed within the interior of the reactor to create a turbulent mixing zone within the fluid medium. The impeller may also assist in propelling the fluid medium through the closed loop of the reactor at sufficient speed to keep solid particulates, such as the catalyst or product polyolefin, suspended within the fluid medium. The impeller may be driven by a motor or other motive force. In an embodiment, polymerization reactor 21 is a loop slurry reactor that is coupled to dump tank system 10 (e.g., reactor effluent line 26 is coupled to dump tank feed line 11) such that dump tank system 10 receives the slurried contents (e.g., inventory) of the loop slurry reactor upon a need to dump same.

The fluid medium within the polymerization reactor 21 may include olefin monomers and comonomers, diluent, co-catalysts (e.g., triethylboron, methyl aluminoxane, alkyls such as triethylaluminum, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the polymerization reactor interior via inlets or conduits at specified locations, such as depicted at polymerization reactor feed line 25.

Likewise, a catalyst, such as those previously discussed, may be added to the polymerization reactor 21 via a conduit at a suitable location, which may include a diluent carrier. An example of a catalyst for polymerizing the ethylene monomer and comonomers which are present includes a chromium oxide containing a hexavalent chromium (or $Cr^{+2}$) on a silica support. It should be explained that in certain embodiments the chromium in the catalyst feedstock is received at the polyolefin facility as $Cr^{+3}$. This catalyst may be subjected to a carbon monoxide (CO) activation process resulting in a valence change to $Cr^{+6}$ in the activated catalyst. Subsequently, during polymerization in the reactor, the $Cr^{+6}$ valence in the activated catalyst changes to $Cr^{+2}$ due to the presence of monomer (e.g., ethylene) in the polymerization contents in the polymerization reactor 21. Advantageously, the $Cr^{+2}$ sites in the catalyst are active for polymerization. However, it should be emphasized, as previously discussed, that a variety of catalyst systems other than chromium systems may be employed.

In total, the added components in the polymerization reactor 21 generally include a fluid medium within the reactor 21 within which the catalyst is a suspended particle. The reaction conditions, such as temperature, pressure, and reactant concentrations, are regulated to facilitate the desired properties and production rate of the polyolefin in the polymerization reactor 21, to control stability of the polymerization reactor 21, and the like. Temperature is typically maintained below that level at which the polymer product would go into solution. Due to the exothermic nature of the polymerization reaction, a cooling fluid may be circulated through jackets around portions of the polymerization reactor 21 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the polymerization reactor 21, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the polymerization reactor 21 via a settling leg or other means, such as, without limitation, a continuous take-off. In downstream processing, as described below, the polyolefin discharged from the polymerization reactor 21 can be extracted from the slurry and purified.

The polymerization reactor effluent removed from polymerization reactor 21 via polymerization reactor effluent line 26 of the polymerization system may include the polymer fluff (e.g., the solid product polyolefin) as well as non-polymer components (e.g., liquid and gaseous non-product components), such as diluent, unreacted monomer and/or comonomer, and residual catalyst. In construction of the polymerization reactor 21 in certain embodiments, a discharge nozzle and conduit may be installed (e.g., welded) at a tap or hole cut into the reactor wall and fluidly connected with polymerization reactor effluent line 26. During online operation (e.g., during polymerization), the polymerization reactor effluent exiting polymerization reactor 21 via polymerization reactor effluent line 26 be subsequently processed, such as by a separation system 40, to separate a majority of the non-solid, non-product (e.g., non-polymer) components 48 (e.g., diluent and unreacted monomer) from a solids discharge 43 (e.g., solid polymer product recover line 42) comprising a majority of the solid product polyolefin and a minor amount of the non-solid components. The non-solid, non-product (e.g., non-polymer) components exiting separation system 40 can be conveyed via line 48 to recycle equipment 50, and recycle equipment 50 can be utilized to recycle one or more of the separated non-solid, non-product components (directly or indirectly via fractionation and/or further treatment) to the polymerization reactor 21 via one or more recycle lines 55. One or more flashline heaters 30 (e.g., with three, first flashline heater 30A, second flashline heater 30B, and third flashline heater 30C, shown in the exemplary embodiments of FIGS. 2 and 3) can be utilized to heat the polymerization reactor effluent 26 prior to introduction into separation apparatus 40. In embodiments, about 5, 10, 15, 20, 25, 30, or more, from 1 to 30, from 5 to 30, or from 10 to 30 flashline heaters or flashline heater sections can be utilized. Although any suitable apparatus and methods known in the art can be utilized to separate the non-product components from the solid product polyolefin during normal operation (e.g., during polymerization), specific apparatus and methods that can be utilized in embodiments of this disclosure will be described below with respect to FIG. 3, which is a schematic of an integrated polymerization system II, according to embodiments of this disclosure.

During normal operation (e.g., during steady-state polymerization, not a polymerization reactor dump), following passage through one or more in-line flash heaters 30 (with three, 30A, 30B, and 30C shown in the embodiments of FIGS. 2 and 3) the polymerization reactor effluent line 26 from polymerization reactor 21 can be introduced into a flash chamber 32 of separation apparatus 40. The in-line flash heater(s) 30A/30B/30C may be a surrounding conduit that uses steam or steam condensate, for example, as a heating medium to provide indirect heating to the polymerization reactor effluent in polymerization reactor effluent line 26. Thus, the polymerization reactor effluent in polymerization reactor effluent line 26 is heated prior to its introduction into the flash chamber 32. Also, before the polymerization reactor effluent enters the flash chamber 32, water or other catalysts poisons may be injected into the polymerization reactor effluent to deactivate any residual catalysts therein. Because these injected components are catalysts poisons by definition, they are typically completely removed, or at least substantially removed, from any recovered material (e.g., monomer or diluent) recycled to the polymerization reactor 21. Flash chamber 32 is configured to separate an overhead flash gas comprising a majority of the non-solid components of the polymerization reactor effluent from a solids discharge 41 comprising a majority of the solid polyolefin and a minor amount of the non-solid components. In the flash chamber 32, most of the non-solid components of the polymerization reactor effluent are withdrawn overhead as vapor in the flash gas 33. In polyethylene production, this vapor is typically primarily diluent, such as isobutane or other diluents previously mentioned. This vapor may also contain the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent employed. In contrast, heavy components or "heavies" may be defined as those components having higher boiling points than the diluent. An exemplary approximate composition of the flash gas 33 is 94 wt % isobutane, 5 wt % ethylene, and 1 wt % other components. A level or volume of polymer fluff may be maintained in the flash chamber 32 to give additional residence time of the polymer fluff in the chamber 32 to facilitate separation of liquid and vapor entrained in the porous fluff particles.

The flash gas 33 may be processed in solids-removal equipment 34 such as, without limitation, cyclones, bag filters, etc., where entrained polymer fluff solids (e.g., typically fine particles or fines) are removed and returned to the flash chamber 32 or to downstream equipment, such as a purge column 42 discussed hereinbelow. The flash gas 33 may also travel through a deoxygenation bed, for example. Furthermore, the flash gas 33 may be conveyed via line 35 and cooled or condensed in a heat exchanger 38 (e.g., shell-and-tube construction). The cooled or condensed flash gas may be conveyed via line 48A to recycle equipment 50 and further recycled to polymerization reactor 21 via recycle line 55 (e.g., via a feed system or fractionation system associated therewith).

In embodiments, the solids (e.g., solid product polyolefin) in the flash chamber 32 are withdrawn with a small amount of entrained diluent (and monomer) and sent to a purge column 42 via solids discharge 41. As will be appreciated by those of ordinary skill in the art, the solids discharge 41 conduit may include valve configurations that allow polymer to flow downward through the conduit while reducing the potential for vapor to flow between the purge column 42 and the flash chamber 32. For example, one or more rotary or cycling valves may be disposed on the solids discharge 41 conduit. Furthermore, one or more relatively small fluff (surge) chambers may also be disposed on the conduit. In embodiments, the fluff solids from the flash chamber 32 is discharged into a lower pressure flash chamber, and a lower pressure flash gas extracted therefrom compressed for recycle to the polymerization reactor 21.

In embodiments, the solids discharge 41 (polyolefin fluff) that exits the flash chamber 32 is introduced into purge column 42. Purge column 42 is configured to subject the solids discharge to nitrogen purge, thus providing a cleaned polymer fluff and a spent purge gas stream comprising nitrogen and at least a portion of the minor amount of the non-solid components transferred to the purge column therewith (e.g., diluent and/or monomer). A purpose of the purge column 42 is to remove residual hydrocarbon from the entering solids streams and to provide substantially-clean polymer fluff in cleaned polymer line 43. The cleaned fluff may be transported or conveyed to an extrusion/loadout system for conversion to pellets, and for distribution and sale as polyolefin pellet resin to customer, as known to those of skill in the art.

In the exemplary purge column system illustrated, the solid polymer product is subjected to nitrogen purge, with nitrogen circulated through purge column 42 to remove residual hydrocarbons via a spent purge gas stream comprising nitrogen and removed residual hydrocarbons extracted via discharge line 44.

The spent purge gas stream in discharge line 44 may be sent through a nitrogen separator 45 operable to separate a nitrogen stream (extractable therefrom via a nitrogen stream outlet line 46) from the spent purge gas stream, and thus provide a hydrocarbon stream comprising the at least a portion of the minority of non-solid components (extractable therefrom via a hydrocarbon stream outlet line 48B). Hydrocarbon stream outlet line 48B can be fluidly connected with recycle line 55 via recycle equipment 50. Nitrogen separator 45 can be any nitrogen separator known in the art, such as a membrane recovery unit, pressure swing adsorption unit, refrigeration unit, and so forth, to recover nitrogen via nitrogen stream 46, and to discharge a separated hydrocarbon stream 48B, which can be returned to polymerization reactor 21 via recycle equipment 50. Nitrogen separator 45 may be known as an Isobutane and Nitrogen Recovery Unit (INRU). Moreover, fresh nitrogen 47 may be added to the nitrogen circuit (e.g., added to nitrogen stream 46) to account for nitrogen losses in the purge column 42 system. As described herein, during a polymerization reactor dump, in embodiments, at least a portion of a nitrogen stream 46 produced by the nitrogen separator 45 (alone or in combination with fresh nitrogen from stream 42) can be introduced into the dump tank system 10 (e.g., via line 15A) as the second heated treatment gas (e.g., the heated nitrogen treatment gas) during the second cleaning stage.

As will be appreciated by those of ordinary skill in the art, a variety of configurations may be employed in the diluent/monomer recovery of separation system 40. For example, the solids discharge 41 from the flash chamber 32 may be sent to another reactor (e.g., a gas phase reactor) instead of to the purge column 42 or to a low-pressure flash chamber (e.g., a second low-pressure flash chamber located between flash chamber 32 and purge column 42). If discharged to another reactor, catalyst poison may not be injected upstream in the polymerization reactor effluent, and, thus, residual active catalysts remain for further polymerization. In another configuration, the purge column 42 may be eliminated from the separation system 40 and combined with a downstream extruder feed tank.

According to this disclosure, the dump tank system 10 is fluidly connected with the polymerization reactor 21 such that the inventory of the polymerization reactor 21 can be transferred into the dump tank system 10 during a polymerization reactor dump. In embodiments, one or more dedicated polymerization reactor dump lines 27 are coupled to dump tank feed line 11 and utilized to transfer the inventory of the polymerization reactor into dump tank system 10. Alternatively, polymerization reactor effluent line 26 is coupled to dump tank feed line 11 and utilized to introduce the polymerization reactor inventory into dump tank system 10 during a reactor dump. For example, as noted above, dump tank feed line 11 of dump tank system 10 as depicted in FIG. 1 can be fluidly connected with reactor 21 of FIG. 2 via one or more dedicated reactor dump lines 27 and/or via reactor effluent line 26. In embodiments, dump tank feed line 11 of dump tank system 10 is fluidly connected with reactor effluent line 26 downstream of at least one of one or more flashline heaters, for example along a first section 31A downstream of first flashline heater 30A, along a second section 31B downstream of second flashline heater 30B, and/or along a third section 31C downstream of third flashline heater 30C, and the contents of the polymerization reactor 21 are introduced (e.g., dumped) into dump tank system 10 via line 11 (for example, as indicated by diversion line 14 in the embodiment of FIG. 3).

In embodiments, during a polymerization reactor dump, a fluid (e.g., diluent, such as isobutane) can be circulated by polymerization reactor 21, through flashline heater(s) 30A/ 30B/30C, and separation apparatus 40, and recycled via recycle equipment 50 and recycle line 55 to polymerization reactor 21. In alternative embodiments, during a polymerization reactor dump, a fluid (e.g., diluent, such as isobutane) can be circulated through separation apparatus 40, recycle equipment 50 and recycle line 55 and bypass line 55' (e.g., with no circulation through polymerization reactor 21). In some such embodiments, polymerization reactor inventory is transferred to dump tank system 10 via a dedicated dump tank feed line(s) 27 coupled to dump tank feed line 11, and the fluid circulation noted above is not altered. In other such embodiments, however, dump tank system 10 is fluidly connected with the polymerization reactor effluent line 26, downstream of at least one of the one or more flashline heaters, whereby at least a portion of a fluid circulated from the polymerization reactor 21 through the separation apparatus 40 and recycled to the polymerization reactor 21 via the recycle equipment 50 and recycle line 55 during a polymerization reactor dump can be diverted to the dump tank system 10 as the first heated treatment gas (e.g., the heated hydrocarbon treatment gas). For example, in the embodiment of FIG. 3, a diversion line 14 fluidly connects dump tank system 10 with second section 31B of the polymerization reactor effluent line 26 downstream of second flashline heater 30B. The diversion line 14 can fluidly connect reactor effluent line 26 with dump tank system 10 anywhere within the flashline heaters, for example, about ⅔ or ¾ along the length of the flashline heaters. For example, if there are 20 flashline heaters, diversion line 14 can connect reactor effluent line 26 with dump tank system 10 after the $13^{th}$-$15^{th}$ flashline heater. For example, in alternative embodiments, diversion line 14 fluidly connects dump tank system 10 with third section 31C of the polymerization reactor effluent line 26 downstream of third flashline heater 30C. In alternative embodiments, diversion line 14 fluidly connects dump tank system 10 with first section 31A of the polymerization reactor effluent line 26 downstream of first flashline heater 30A. In this manner, a portion of the circulating fluid heated in one or more of the one or more flashline heaters 30 can be introduced into dump tank system 10 as the hydrocarbon treatment gas (e.g., via heated treatment gas line 15'). In this manner, the flashline heater(s) can be utilized as heater 6 (e.g., of the embodiment of FIG. 1) to heat the fluid and provide the first heated treatment gas (e.g., the heated hydrocarbon treatment gas) for introduction into dump tank system 10.

By utilizing a diverted portion of the circulating fluid as the heated hydrocarbon fluid to increase the rate of heat input into the dump tank system 10, as described herein, advantage can be taken of the large flow and heating capabilities of the existing flashline heaters. Conventionally, the polymerization reactor 21 is often operated to circulate a fluid (e.g., isobutane) continuously through the flash line heaters to the separation system 40 and recycle equipment 50 while the plant is attempting to clear the dump tank system 10 (in other words, inert diluent such as isobutane is circulated through the polymerization system II during the time between dumping of the contents of reactor 21 to dump tank system 10 and completion of cleanout of the dump tank system 10 such that the polymerization reactor 21 can be restarted). According to embodiments of this disclosure, a portion or all of this heated fluid (e.g., isobutane gas) exiting the flash line heaters can be diverted via lines 14 and 15' into a gas distribution system 7 located in the bottom portion (e.g., lower 10, 15, 20, 30, 40% of the total height $H_T$) of the dump tank vessel 12 to effect the first cleaning. In such embodiments, an additional heater 6 can be utilized to heat nitrogen for introduction into dump tank vessel 12 as second heated treatment gas (e.g., via heated treatment gas line 15') during a second cleaning stage subsequent the first cleaning stage.

In embodiments, at least a portion of the circulating fluid (e.g., recycled isobutane) is diverted from the recycle line 55 to the polymerization reactor effluent line 26 upstream of at least one of the one or more flashline heaters 30, without passing through the polymerization reactor 21. For example, as shown in FIG. 3, a bypass line 55' fluidly connecting the recycle line 55 with the polymerization reactor effluent line 26 can be utilized to divert at least a portion of the fluid (e.g., isobutane) circulated from the recycle equipment 50 to the polymerization reactor 21 during a polymerization reactor dump for introduction into at least one of the one or more flashline heaters, bypassing the polymerization reactor 21. For example, in the embodiment of FIG. 3, bypass line 55' fluidly connects recycle line 55 directly with the polymerization reactor effluent line 26 upstream of first flashline heater 30A. In alternative embodiments, bypass line 55' can fluidly connect recycle line 55 directly with the first section 31A of the polymerization reactor effluent line 26 downstream of first flashline heater 30A and upstream of second flashline heater 30B. In alternative embodiments, bypass line 55' can fluidly connect recycle line 55 directly with the second section 31B of the polymerization reactor effluent line 26 downstream of second flashline heater 30B and upstream of third flashline heater 30C. In the event of circulating pump failure (e.g., in a slurry loop reactor 21) and the contents/inventory of the polymerization reactor 21 has been dumped to the dump tank system 10, bypass line 55' can pump fluid (e.g., isobutane) from the recycle equipment 50 (e.g., from a recycle isobutane pump thereof) to directly supply isobutane into one or more of the one or more flashline heaters 30A/30B/30C to provide first heated treatment gas (e.g., isobutane gas) for the dump tank heating process of the first cleaning stage.

The system and method of this disclosure may provide a number of benefits relative to conventional systems (e.g., dump tanks) and methods utilized for removing non-product components from a polymer fluff transferred to a dump tank during a polymerization reactor dump. Without limitation, a number of potential advantages will be outlined hereinbelow.

The herein disclosed dump tank and method of operating same provide for increasing the heating rate in the dump tank. Another advantage is that very little additional major equipment may be required to implement the dump tank according to embodiments of this disclosure, for example via use of the existing flash line heaters to provide the heated hydrocarbon (e.g., isobutane) treatment gas as described above. In embodiments, the additional equipment comprises a purge distribution system 7 inside of the dump tank vessel 12 as well as associated piping and valving to make the appropriate fluid connections/coupling described herein.

As the first treatment gas (e.g., the hydrocarbon treatment gas) has a higher heat capacity than nitrogen and a density about 75% that of nitrogen, a volumetric flow of the first treatment gas is less than a flow of the second treatment gas comprising nitrogen at the same enthalpy basis. Accordingly, in embodiments, a time required for purging the dump tank following depressurizing (e.g., a time required for the first cleaning stage and optionally the second cleaning stage) can be less than a time required to achieve the same heat transfer between a treatment gas comprising solely nitrogen (i.e., absent the first cleaning stage as described herein). Additionally, the dump tank dimensions may be more flexible for a given hold volume of polymer fluff, and a wider range of height to diameter (e.g., $H_T/D_1$) can be selected to meet the requirements of non-fluidization, space constraints, elevation and/or flow distributor.

In embodiments, the reduced flow needed for the same enthalpy basis provides for a reduction in size of an overhead filter or cyclone utilized to knock out entrained polymer particles. In embodiments, a conventional steam jacket utilized to heat a cone of the dump tank is not required, facilitating fabrication of vessel 12 of dump tank system 10 and minimizing the risk of polymer melting during dump tank purging.

The reduction in the amount of nitrogen gas utilized for purging the dump tank via the herein disclosed method can provide for a reduction in an amount of nitrogen vented to flare and a concomitant reduction in NOx emissions during dump tank cleaning/purging.

As noted hereinabove, in many cases, a fluid (e.g., isobutane) circulates continuously through the flash line heaters (e.g., flashline heaters 30A/30B/30C), to the separation system 40, recycle equipment 50, recycle line 55 and bypass line 55' (e.g., bypassing polymerization reactor feed line 25) while the plant is attempting to clear the dump tank system 10. By utilizing a diverted portion of the circulating fluid to provide the first heated treatment gas (e.g., the heated hydrocarbon gas) to increase the rate of heat input into the dump tank system 10, according to embodiments described herein, advantage can be taken of the large flow and heating capabilities of the existing flashline heaters. According to embodiments of this disclosure, a portion or all of this heated fluid (e.g., isobutane gas) exiting the flash line heaters can be diverted into a gas distribution system 7 located in the bottom portion (e.g., lower 10, 15, 20, 30, 40% of the total height $H_T$) of the dump tank vessel 12 during the first cleaning stage described herein.

In embodiments, the hydrocarbon treatment gas comprises fuel gas and is introduced into the dump tank system 10 as first treatment gas during the first cleaning stage prior to a second cleaning stage, whereby a reduced total volume of nitrogen is utilized to purge the polymer bed in the dump tank. In such embodiments, the first gas (e.g., the spent treatment gas comprising flue gas from the first cleaning stage) can be sent directly to flare, in embodiments. As fuel gas has a smaller molecular size than non-product hydrocarbons present in the transferred polymer inventory, less fuel gas sorbs on the polymer and the smaller sorbed hydrocarbons can thus diffuse out more quickly during a second cleaning stage (e.g., nitrogen purge) of the dump tank system 10, relative to purging the transferred polymer inventory directly/solely with nitrogen (i.e., relative to purging without the first cleaning stage).

As the first gas obtained during the first cleaning stage can be sent to existing hydrocarbon recovery apparatus (e.g., an INRU) of separation system 40, in embodiments, hydrocarbon losses can be reduced relative to dump tank purging utilizing solely nitrogen as treatment/purging gas.

Utilization of a first treatment gas as described herein, such as fuel gas, can reduce a risk of condensation of the purge gas during cleaning/purging of the dump tank relative to utilizing heavier hydrocarbons as a purge gas.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Comparative Example 1: Nitrogen as Treatment Gas

By way of example, introduction of nitrogen heated to a temperature of 190° F. at near-atmospheric pressure where the density of the nitrogen is about 0.08 lb/ft³ to a dump tank and allowing it to cool to 90° F., transferring 100° F. of heat, and assuming that the heat capacity of the nitrogen is around 0.25 BTU/lb-° F., and applying a 4 feet/minute maximum velocity limitation due to fluidization, the following quantity of heat may be applied per unit cross-sectional area of the dump tank via the heated nitrogen:

Heat Per Unit Area=(100° F.)*(0.25 BTU/lb-° F.)*
(0.08 lb/ft³)*(4 feet/minute)*(60 minutes/hour)
=480 BTU/hour-ft².

Although higher pressures and higher mass flows of nitrogen could be utilized, this would require additional systems to process the nitrogen for recycle or flaring this high flow rate of nitrogen, which each carry with them various capital cost or environmental downsides.

Example 1: Isobutane as Hydrocarbon Treatment Gas

Figure 5:
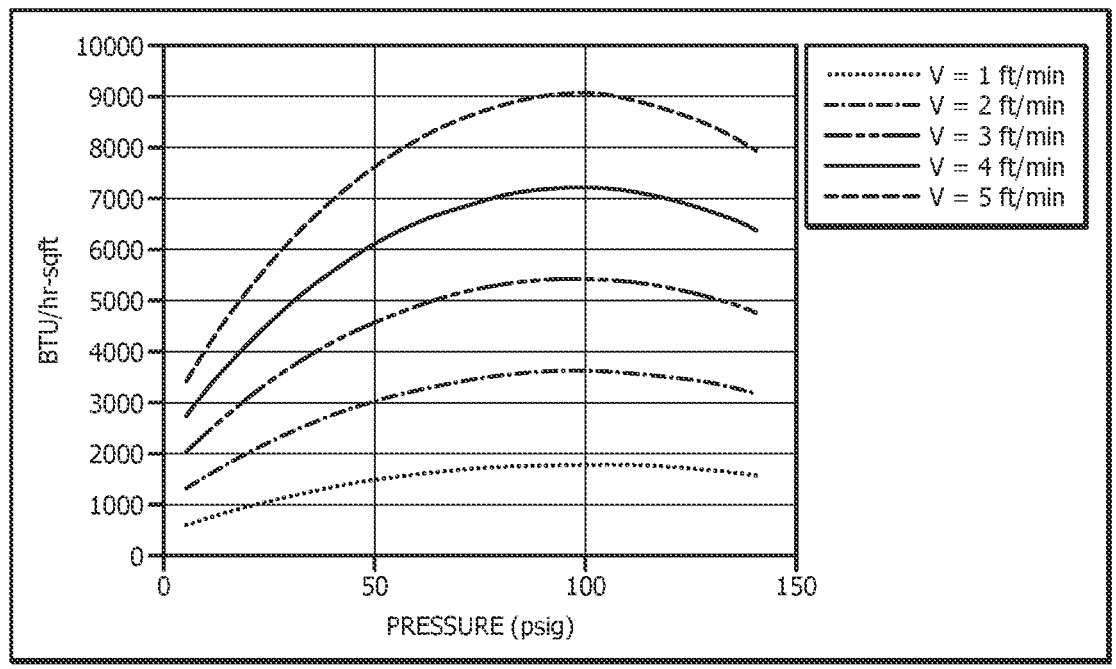
FIG. 5 is a plot of the maximum heating rate per unit cross-sectional area as a function of dump tank back-pressure and superficial velocity, as described in Example 1.

FIG. 5 is a plot of the maximum heating rate per unit cross-sectional area as a function of dump tank back-pressure and superficial velocity. In this example, a hydrocarbon treatment gas consisting of isobutane having a temperature of 190° C. is utilized. As seen in FIG. 5, an optimum dump tank pressure of around 100 psig results when the isobutane is heated to 190° F.

Figure 6:
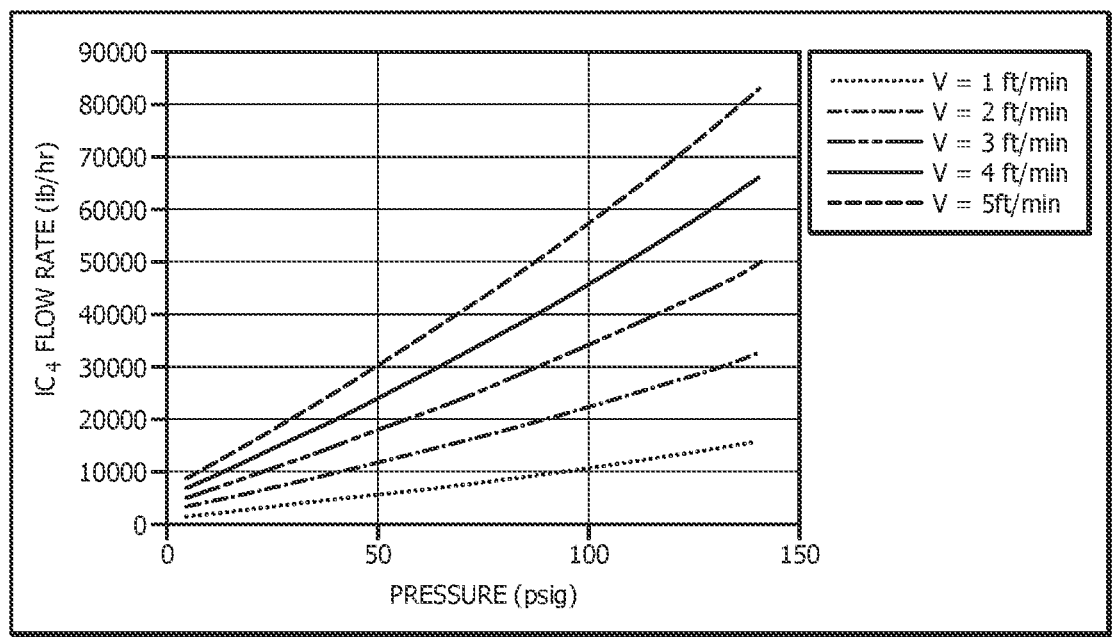
FIG. 6 is a schematic of the flow rate of isobutane as a function of dump tank back-pressure and superficial velocity, as described in Example 1.

FIG. 6 is a plot of the flow rate of isobutane as a function of dump tank back-pressure and superficial velocity. As seen in FIG. 6, by holding backpressure in the dump tank, a significantly higher mass of isobutane can be added compared with nitrogen at low pressure. Furthermore, this mass of isobutane carries a higher heat capacity, further increasing the maximum achievable heating rate of the dump tank.

The dump tank and method of heating a dump tank as described herein can thus be utilized to deliver on the order of 6000 to 7000 BTU/hour-ft² of heat into the dump tank, an increase of almost 12 to 15 times that provided by utilizing only nitrogen, as described in Comparative Example 1 above. Assuming that heat delivery to the dump tank is the dominant restriction on the rate at which the dump tank can be purged, a clear benefit is provided by increasing the rate of dump tank heating via a first cleaning stage as described herein, resulting in a greatly reduced cleanout time for the dump tank system 10 (and associated minimization of costly polymerization unit downtime).

Example 2: Fuel Gas as Hydrocarbon Treatment Gas

At purging conditions, the heat capacity ($Cp_1$) of fuel gas (e.g., 0.55 btu/lb-° F.) is about twice as much as the heat capacity ($Cp_2$) of $N_2$ (0.25 btu/lb-° F.). The density ($\rho_1$) of fuel gas (e.g., 0.12 lb/ft³) is 75% of the density ($\rho_2$) of $N_2$ (0.16 lb/ft₃). Therefore, the volumetric flow of fuel gas ($V_1=(Cp_2*\rho_2)/(Cp_1*\rho_1)$) is only about 66% of volumetric flow of $N_2$ ($V_2$) at the same enthalpy basis. Accordingly, fuel gas can be utilized as hydrocarbon treatment gas during the first cleaning stage to likewise decrease cleanout time for the dump tank system 10, according to embodiments of this disclosure.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A method of operating a dump tank of a polymer production process, the method comprising: transferring all or a portion of a content of a polymerization reactor into the dump tank, wherein the reactor contents comprise solid polymer, and liquid and gaseous non-product components; and removing at least a portion of the liquid and gaseous non-product components from the dump tank by: reducing a pressure of the dump tank, whereby a flash gas comprising a first portion of the at least a portion of the liquid and gaseous non-product components is recovered from the dump tank; subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising a second portion of the at least a portion of the liquid and gaseous non-product components from the dump tank during the first cleaning stage; and subjecting the solid polymer to a second cleaning stage comprising purging the solid polymer by introducing a second heated treatment gas comprising primarily nitrogen into the dump tank and recovering a second gas comprising a third portion of the at least a portion of the liquid and gaseous non-product components from the dump tank during the second cleaning stage.

B: A system comprising: a dump tank into which all or a portion of a content of a polymerization reactor can be transferred during a polymerization reactor dump in a polymer production process, wherein the dump tank comprises: a gas distribution system configured to distribute a treatment gas introduced thereto via a treatment gas inlet line substantially uniformly across a cross section of the dump tank, wherein the gas distribution system is located in a bottom portion of the dump tank; a heater operable to increase temperature of the treatment gas to a treatment gas temperature; an overhead gas line fluidly connecting the dump tank with a flare; and a vent filter on the overhead gas line, wherein the vent filter is operable to collect entrained polymer particles in a gas passing through the overhead gas line.

C: A method of producing polyolefins, the method comprising:
(i) during normal operation: polymerizing a polymerization feed comprising a monomer, a diluent, and optionally a co-monomer in the presence of a polymerization catalyst to produce a polymerization effluent comprising solid polymer, and liquid and gaseous non-product components; passing the polymerization reactor effluent through one or more flashline heaters configured to indirectly heat the polymerization reactor effluent; separating one or more of the non-product components from the polymerization reactor effluent via a separation apparatus; and recycling at least one of the one or more separated non-product components to the polymerization reactor via a recycle line, and (ii) during a polymerization reactor dump: transferring all or a portion of a content of the polymerization reactor into a dump tank, wherein the reactor contents comprise solid polymer, and liquid and gaseous non-product components; and removing at least a portion of the non-product components from the dump tank by: reducing a pressure of the dump tank, whereby a flash gas comprising a first portion of the at least a portion of the non-product components is recovered from the dump tank; subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising a second portion of the at least a portion of the non-product components from the dump tank during the first cleaning stage; and subjecting the solid polymer to a second cleaning stage comprising purging the solid polymer by introducing a second heated treatment gas comprising primarily nitrogen into the dump tank and recovering a second gas comprising a third portion of the at least a portion of the non-product components from the dump tank during the second cleaning stage.

Each of embodiments A, B, and C may have one or more of the following additional elements: Element 1: wherein the first heated treatment gas introduced into the dump tank during the first cleaning stage comprises one or more hydrocarbons having from one to five carbons (C1-C5 hydrocarbons). Element 2: wherein the first heated treatment gas introduced into the dump tank during the first cleaning stage has a temperature that is in a range of from about 85 to about 95, from about 80 to about 90, or from about 90 to about 95% of a melting temperature of the solid polymer. Element 3: wherein the first cleaning stage temperature is in a range of from about 85 to about 95, from about 80 to about 90, or from about 90 to about 95% of a melting temperature of the solid polymer. Element 4: wherein the first heated treatment gas comprises isobutane, isopentane, fuel gas, propane, propylene, or a combination thereof. Element 5: wherein the first heated treatment gas is introduced into a bottom portion of the dump tank. Element 6: wherein the first heated treatment gas is introduced into the dump tank via a gas distribution system operable to distribute the first heated treatment gas substantially uniformly about a cross sectional area of the dump tank. Element 7: wherein the gas distribution system comprises a fluidized bed grid plate, a distributor, or a combination thereof. Element 8: further comprising introducing the first heated treatment gas into the dump tank at a superficial velocity that is below a minimum fluidization velocity of the solid polymer therein. Element 9: further comprising maintaining a dump tank back pressure during the first cleaning stage. Element 10: wherein, during the first cleaning stage, a rate of heating per cross sectional area of the dump tank of greater than or equal to about 5000 BTU/h-ft$^2$ is provided by the introduction of the first heated treatment gas. Element 11: further comprising selecting a flow rate of the first heated treatment gas, a temperature of the first heated treatment gas, a back pressure of the dump tank, or a combination thereof to minimize a first cleaning stage time, wherein the first cleaning stage time is a duration of the first cleaning stage. Element 12: wherein the first cleaning stage temperature of the first cleaning stage is attained in a first cleaning stage time of less than or equal to about 10 hours, wherein the first cleaning stage time is a duration of the first cleaning stage. Element 13: wherein a time required to remove the at least a portion of the liquid and gaseous non-product components from the polymer fluff is less than or equal to about 80% of a time required to remove a same at least a portion of the liquid and gaseous non-product components from a same solid polymer via a same method except utilizing a single cleaning stage employing a heated treatment gas comprising primarily nitrogen rather two cleaning stages wherein the first cleaning stage employs the first heated treatment gas comprising primarily one or more hydrocarbons. Element 14: further comprising flaring the first gas, wherein the method produces an amount of NOx emissions from flaring that is less than or equal to an amount of NOx emissions produced via a same method except utilizing a single cleaning stage employing a heated treatment gas comprising primarily nitrogen rather two cleaning stages wherein the first cleaning stage employs the first heated treatment gas comprising primarily one or more hydrocarbons. Element 15: wherein the polymer production process comprises an isobutane nitrogen recovery unit (INRU), and wherein at least a portion of the nitrogen introduced into the dump tank via the second treatment gas comprises nitrogen recovered from the INRU. Element 16: further comprising introducing the second gas into the INRU or another separation apparatus operable to separate nitrogen from the second gas. Element 17: wherein the dump tank is a cylindrical vessel having a bottom cone section. Element 18: wherein the gas distribution system is at least partially within the bottom cone section, proximate above the bottom cone section, proximate below the bottom cone section, or a combination thereof. Element 19: wherein the dump tank does not comprise a steam jacket in contact with the bottom cone section. Element 20: wherein the bottom cone section forms an angle of less than or equal to 45, 60, or 70 degrees from horizontal. Element 21: further comprising: a polymerization reactor operable to polymerize a monomer in the presence of a polymerization catalyst to produce a polymerization effluent comprising solid polymer and non-solid components; a polymerization reactor effluent line operable to remove the polymerization effluent from the polymerization reactor; one or more flashline heaters positioned proximate the polymerization reactor effluent line and configured to indirectly heat the polymerization reactor effluent; a separation apparatus configured to receive the heated polymerization reactor effluent, separate a majority of the non-solid components from the solid polymer, and yield a solids discharge comprising a majority of the solid polymer and a minor amount of the non-solid components; and recycle equipment configured to recycle one or more of the separated non-solid components to the polymerization reactor via a recycle line, wherein the dump tank is fluidly connected with the polymerization reactor such that the inventory of the polymerization reactor can be transferred into the dump tank during the polymerization reactor dump. Element 22: wherein the dump tank is fluidly connected with the polymerization reactor effluent line, downstream of at least one of the one or more flashline heaters, whereby at least a portion of a fluid circulated from the polymerization reactor through the separation apparatus and recycled to the polymerization reactor via the recycle equipment during a polymerization reactor dump can be diverted to the dump tank as the treatment gas. Element 23: further comprising a bypass line fluidly connecting the recycle line with the polymerization reactor effluent line, whereby at least a of the fluid circulated from the recycle equipment to the polymerization reactor during a polymerization reactor dump can be diverted for introduction into at least one of the one or more flashline heaters without passing through the polymerization reactor and the diverted portion can be introduced into the dump tank as treatment gas. Element 24: wherein the separation apparatus comprises: a flash chamber configured to receive and separate the heated polymerization reactor effluent into an overhead flash gas comprising a majority of the non-solid components and a solids discharge comprising a majority of the solid polyolefin and a minor amount of the non-solid components; a purge column configured to receive the solids discharge and subject the solids discharge to nitrogen purge, thus providing a cleaned solid polymer and a spent purge gas stream comprising nitrogen and at least a portion of the minor amount of the non-solid components; and a nitrogen separator configured to receive and separate the spent purge gas stream into a nitrogen stream, extractable therefrom via a nitrogen stream outlet line, and a hydrocarbon stream comprising the at least a portion of the minority of non-solid components, extractable therefrom via a hydrocarbon stream outlet line, wherein the recycle line is fluidly connected with the hydrocarbon stream outlet line. Element 25: further comprising a line fluidly connecting the nitrogen stream outlet line with the dump tank, whereby at least a portion of the nitrogen stream can be introduced into the dump tank as the treatment gas. Element 26: further comprising, during a polymerization reactor dump (ii), circulating a fluid from the polymerization reactor though the one or more flashline heaters, the separation apparatus, and the recycle line back to the polymerization reactor, and diverting at least a portion of the fluid to the dump tank as the first heated treatment gas. Element 27: wherein the at least a portion of the fluid is diverted to the dump tank downstream of at least one of the one or more flashline heaters. Element 28: wherein the at least a portion of the fluid is diverted from the recycle line to the dump tank, without passing through the polymerization reactor. Element 29: wherein separating one or more of the non-product components from the polymerization reactor effluent via the separation apparatus further comprises: separating, in a flash chamber, the polymerization reactor effluent into an overhead flash gas comprising a majority of the non-product components to provide a solids discharge comprising a majority of the solid product polyolefin and a minor amount of the non-product components; subjecting the solids discharge to nitrogen purge in a purge column, thus separating a cleaned polymer fluff from a spent purge gas stream comprising nitrogen and at least a portion of the minor amount of the non-product components; and separating, in a nitrogen separator, a nitrogen stream from the spent purge gas stream to provide a hydrocarbon stream comprising the at least a portion of the minor amount of non-solid components, wherein the one or more separated non-product components recycled to the polymerization reactor comprise at least a portion of the hydrocarbon stream. Element 30: wherein at least a portion of the nitrogen introduced into the dump tank as the second heated treatment gas during the second cleaning stage during a polymerization reactor dump (ii) comprises nitrogen separated in the nitrogen separator from the spent purge gas stream and/or from another nitrogen-containing stream. Element 31: wherein the another nitrogen-containing stream comprises the second gas. Element 32: wherein the nitrogen separator comprises a membrane recovery unit, a pressure swing adsorption unit, a refrigeration unit, or a combination thereof. Element 33: wherein the nitrogen separator comprises an Isobutane and Nitrogen Recovery Unit (INRU).

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of operating a dump tank of a polymer production process, the method comprising:
transferring all or a portion of a content of a polymerization reactor into the dump tank, wherein the reactor contents comprise solid polymer, and liquid and gaseous non-product components; and
removing at least a portion of the liquid and gaseous non-product components from the dump tank by:
reducing a pressure of the dump tank, whereby a flash gas comprising a first portion of the at least a portion of the liquid and gaseous non-product components is recovered from the dump tank;
subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising at least a portion of the first heated treatment gas and a second portion of the at least a portion of the liquid and gaseous non-product components from the dump tank during the first cleaning stage; and removing a portion of the one or more hydrocarbons from the first gas to yield recovered hydrocarbons and a treated first gas, further comprising subjecting the solid polymer to a second cleaning stage comprising purging the solid polymer by introducing a second heated treatment gas comprising primarily nitrogen into the dump tank and recovering a second gas comprising a third portion of the at least a portion of the liquid and gaseous non-product components from the dump tank during the second cleaning stage.

2. A method of operating a dump tank of a polymer production process, the method comprising:

transferring all or a portion of a content of a polymerization reactor into the dump tank, wherein the reactor contents comprise solid polymer, and liquid and gaseous non-product components; and removing at least a portion of the liquid and gaseous non-product components from the dump tank by:

reducing a pressure of the dump tank, whereby a flash gas comprising a first portion of the at least a portion of the liquid and gaseous non-product components is recovered from the dump tank;

subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising at least a portion of the first heated treatment gas and a second portion of the at least a portion of the liquid and gaseous non-product components from the dump tank during the first cleaning stage; and removing a portion of the one or more hydrocarbons from the first gas to yield recovered hydrocarbons and a treated first gas, further comprising recycling a portion of the recovered hydrocarbons to the polymerization reactor, the dump tank, or both and further comprising subjecting the solid polymer to a second cleaning stage comprising purging the solid polymer by introducing a second heated treatment gas comprising primarily nitrogen into the dump tank and recovering a second gas comprising a third portion of the at least a portion of the liquid and gaseous non-product components from the dump tank during the second cleaning stage.

3. A method of operating a dump tank of a polymer production process, the method comprising:

transferring all or a portion of a content of a polymerization reactor into the dump tank, wherein the reactor contents comprise solid polymer, and liquid and gaseous non-product components; and removing at least a portion of the liquid and gaseous non-product components from the dump tank by:

reducing a pressure of the dump tank, whereby a flash gas comprising a first portion of the at least a portion of the liquid and gaseous non-product components is recovered from the dump tank;

subjecting the solid polymer to a first cleaning stage comprising heating the solid polymer by introducing a first heated treatment gas comprising primarily one or more hydrocarbons into the dump tank until a first cleaning stage temperature of the solid polymer is attained and recovering a first gas comprising at least a portion of the first heated treatment gas and a second portion of the at least a portion of the liquid and gaseous non-product components from the dump tank during the first cleaning stage; and removing a portion of the one or more hydrocarbons from the first gas to yield recovered hydrocarbons and a treated first gas, further comprising recycling a portion of the recovered hydrocarbons to the polymerization reactor, the dump tank, or both, further comprising flaring at least a portion of the treated first gas, and further comprising subjecting the solid polymer to a second cleaning stage comprising purging the solid polymer by introducing a second heated treatment gas comprising primarily nitrogen into the dump tank and recovering a second gas comprising a third portion of the at least a portion of the liquid and gaseous non-product components from the dump tank during the second cleaning stage.

4. The method of claim 1, further comprising removing a portion of the nitrogen from the second gas to yield recovered nitrogen and a treated second gas.

5. The method of claim 2, further comprising removing a portion of the nitrogen from the second gas to yield recovered nitrogen and a treated second gas.

6. The method of claim 3, further comprising removing a portion of the nitrogen from the second gas to yield recovered nitrogen and a treated second gas.

7. The method of claim 4, further comprising recycling a portion of the recovered nitrogen to the dump tank.

8. The method of claim 5, further comprising recycling a portion of the recovered nitrogen to the dump tank.

9. The method of claim 6, further comprising recycling a portion of the recovered nitrogen to the dump tank.

10. The method of claim 4, further comprising flaring at least a portion of the treated second gas.

11. The method of claim 5, further comprising flaring at least a portion of the treated second gas.

12. The method of claim 6, further comprising flaring at least a portion of the treated second gas.

13. The method of claim 7, further comprising flaring at least a portion of the treated second gas.

14. The method of claim 8, further comprising flaring at least a portion of the treated second gas.

15. The method of claim 9, further comprising flaring at least a portion of the treated second gas.

16. The method of claim 8, wherein the polymer production process comprises an isobutane nitrogen recovery unit (INRU), and wherein at least a portion of the nitrogen introduced into the dump tank via the second treatment gas comprises nitrogen recovered from the INRU.

17. The method of claim 16, further comprising introducing the second gas into the INRU or another separation apparatus operable to separate nitrogen from the second gas.

18. The method of claim 1, further comprising recycling a portion of the recovered hydrocarbons to the polymerization reactor, the dump tank, or both.

19. The method of claim 1, further comprising flaring at least a portion of the treated first gas.

20. The method of claim 2, further comprising flaring at least a portion of the treated first gas.

21. The method of claim 18, further comprising flaring at least a portion of the treated first gas.

\* \* \* \* \*